(12) United States Patent
Matsuoka et al.

(10) Patent No.: US 7,259,918 B2
(45) Date of Patent: Aug. 21, 2007

(54) PROJECTION DEVICE

(75) Inventors: Shohei Matsuoka, Tokyo (JP); Ken Agatsuma, Tokyo (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 11/484,901

(22) Filed: Jul. 12, 2006

(65) Prior Publication Data

US 2007/0014026 A1    Jan. 18, 2007

(30) Foreign Application Priority Data

Jul. 12, 2005    (JP) ............................ 2005-202795

(51) Int. Cl.
*G02B 9/00*    (2006.01)

(52) U.S. Cl. ..................... 359/649; 359/650; 359/651; 359/362; 353/71; 353/98

(58) Field of Classification Search ........ 359/642–797, 359/362
See application file for complete search history.

(56) References Cited

U.S. PATENT DOCUMENTS

| 5,442,413 | A | 8/1995 | Tejima et al. |
| 6,805,447 | B2 | 10/2004 | Takeuchi et al. |
| 2005/0018148 | A1 | 1/2005 | Hasegawa |

FOREIGN PATENT DOCUMENTS

| JP | 05-088264 A | 4/1993 |
| JP | 06-186498 A | 7/1994 |
| JP | 06-265814 A | 9/1994 |
| JP | 07-311363 A | 11/1995 |
| JP | 09-203881 A | 8/1997 |
| JP | 2002-207190 A | 7/2002 |
| JP | 2003-287813 A | 10/2003 |
| JP | 2005-043681 A | 2/2005 |

*Primary Examiner*—Scott J. Sugarman
*Assistant Examiner*—James R Greece
(74) *Attorney, Agent, or Firm*—Day Pitney LLP

(57) ABSTRACT

A projection device includes an image source unit, a first projecting optical system, an intermediate optical system, and a second projecting optical system. The image displaying area of the image source unit is tilted with respect to a first virtual plane, and an intermediate image is tilted with respect at least the first virtual plane. A following relationship is satisfied:

$$-1 > \frac{\tan\theta 2}{\tan\theta 1} > \frac{f1}{\frac{H}{2}\sin\theta 1}$$

where, $f1$ denotes a focal length of the first projecting optical system, $\theta 1$ denotes a tilt angle of the image display surface of the image source unit with respect to the first virtual plane, H represents a length of the image source unit which corresponds to the image projected on the screen in the vertical direction, and $\theta 2$ denotes a tilt angle of the intermediate image with respect to the first imaginary surface.

4 Claims, 4 Drawing Sheets

PROJECTION DEVICE

BACKGROUND OF THE INVENTION

The present invention relates to a projection device configured to obliquely project an image formed on an image source to a screen using a trapezoidal intermediate image.

Conventionally, a projection device that obliquely projects an image displayed on an image source unit onto a screen has been known. It is noted that, in the following description, a term "projection device" represents the obliquely displaying type project device as described above.

Generally, the projection device is configured such that an image source displays an image to be projected on the screen. The image is typically a rectangular shape with a predetermined aspect ratio. Using a first optical system, light carrying the image displayed by the image source is converged on an intermediate image plane. It is noted that the light is obliquely incident on the intermediate image plane, and the image formed on the intermediate image plane has a trapezoidal shape. Next, the image formed on the intermediate image plane is projected on the screen using a second optical system. The light is also incident on the screen obliquely such that the trapezoidal shape of the intermediate image is re-shaped and a rectangular image is formed on the screen.

Further, the image source, the first optical system and an intermediate image plane are arranged to satisfy Scheinpflug's law. Similarly, the intermediate image plane, the second optical system and the screen are arranged to satisfy Scheinpflug's law. With such a configuration, the image displayed on the image source unit can be displayed on the screen by obliquely incident light carrying the image with focused condition.

An example of such an projection device is disclosed in Japanese Patent Provisional Publication No. HEI 06-265814 (hereinafter, referred to as '814 publication).

In '814 publication, a real image reducing the image displayed on the image source unit is formed as the intermediate image, and the real image is obliquely projected on the screen with a screen side optically system. According to '814 publication, however, since a reduced intermediate image is formed, if dust or small particles invade on an image plane of the intermediate image, the quality of the image is significantly deteriorated. Further, since heat concentrates in the vicinity of the intermediate image plane, deterioration of the optical system itself may be accelerated. Further, due to the heat, a plastic lens, which is considered to have high design freedom, cannot be used as optical elements (e.g., lens) arranged in the vicinity of the intermediate image plane.

Furthermore, in order to form a reduced intermediate image, it is necessary to decrease an F-number of the image source side optical system. In such a case, a difference of incident angles of rays incident on an element in the vicinity of the intermediate image at both side ends of the element increases. Due to this angular difference, refraction angles of rays incident on the optical element are uneven, which causes aberration. That is, the configuration of decreasing the F-number deteriorates optical performance of the image source side optical system.

SUMMARY OF THE INVENTION

Aspects of the invention provide a projection device which can suppress the heat concentration in the vicinity of the intermediate image plane, and can provide of design and arrangement freedom in each optical system. Aspects of the invention also prevent deterioration of the optical performance on the image source unit side optical system.

According to aspects of the invention, there is provided a projection device, which is provided with an image source unit configured to emit light carrying an image, a first projecting optical system configured to form an intermediate image carried by the light emitted by the image source unit, a second projecting optical system, an intermediate optical system configured to lead light carrying an image from the first projecting optical system to the second projecting optical system. The second projecting optical system is configured to project light lead by the intermediate optical system to a screen of the projection device. An image displaying surface of the image source unit is tilted with respect to a first imaginary plane that is perpendicular to an optical axis of the first projecting optical system. The intermediate image is tilted with respect at least the first imaginary plane. With this configuration, the following relationship is satisfied:

$$-1 > \frac{\tan\theta 2}{\tan\theta 1} > \frac{f1}{\frac{H}{2}\sin\theta 1}$$

where, f1 denotes a focal length of the first projecting optical system, θ1 denotes a tilt angle of the image displaying surface of the image source unit with respect to the first virtual plane, H represents a length of the image source unit which corresponds to the image projected on the screen in the vertical direction, and θ2 denotes a tilt angle of the intermediate image with respect to the first virtual surface. The tilt angel θ1 is measured in a direction from the image displaying surface of the image source toward the first imaginary plane, and the tilt angel θ2 is measured in a direction from the first imaginary plane toward the intermediate image.

The intermediate image may be tilted with respect to a second imaginary plane that is perpendicular to an optical axis of the second projecting optical system, and the following relationship is satisfied:

$$\frac{\tan\theta 2}{\tan\theta 1}\left(1 - \frac{d\sin\theta 3}{f2}\right) \leq -1$$

where, d denotes a distance between the optical axes of the first projecting optical system and the second projecting optical system on an image plane of the intermediate image, f2 denotes a focal length of the second projecting optical system, and θ3 denotes a tilt angle of the intermediate image with respect to the second virtual plane. The tilt angle θ3 is also measured in a direction from the intermediate image toward the second imaginary plane.

The optical axis of the first projecting optical system and the optical axis of the second projecting optical system are on a same plane when an optical path is developed. The distance d is set such that the second projecting optical axis approaches the optical axis of the first projecting optical system.

The intermediate optical system may be arranged in the vicinity of the intermediate image.

BRIEF DESCRIPTION OF THE ACCOMPANYING DRAWINGS

FIG. 1 schematically shows a configuration of a projection device according to an embodiment of the invention.

DETAILED DESCRIPTION OF THE EMBODIMENTS

Hereinafter, referring to the accompanying drawings, scanning lenses according to embodiments of the invention will be described.

Figure 1:
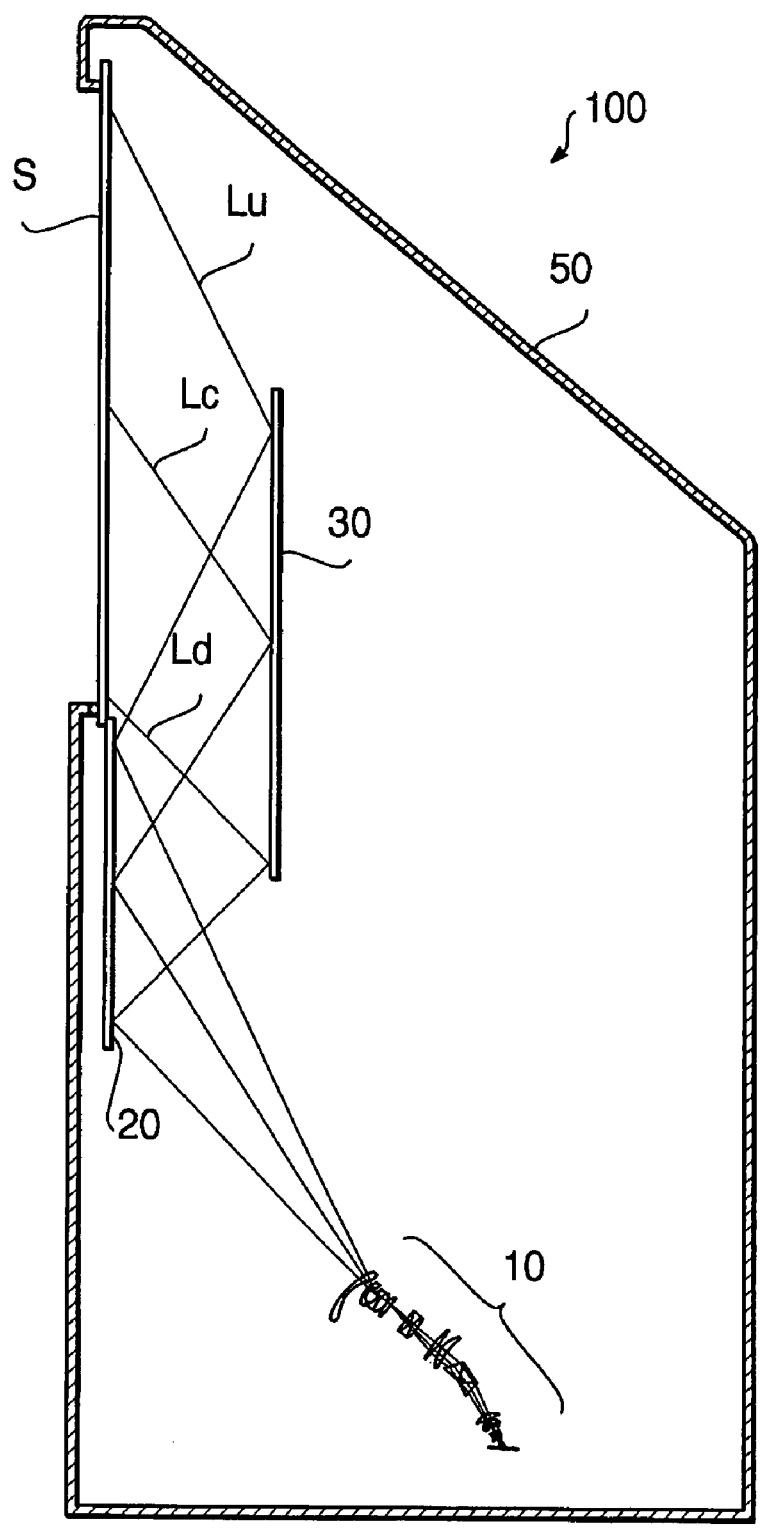

FIG. 1 schematically shows a configuration of a projection device 100 according to an embodiment of the invention. The projection device 100 has a housing 50, which accommodates a projecting optical system 10, a first mirror 20, a second mirror 30 and a screen S.

Figure 2:
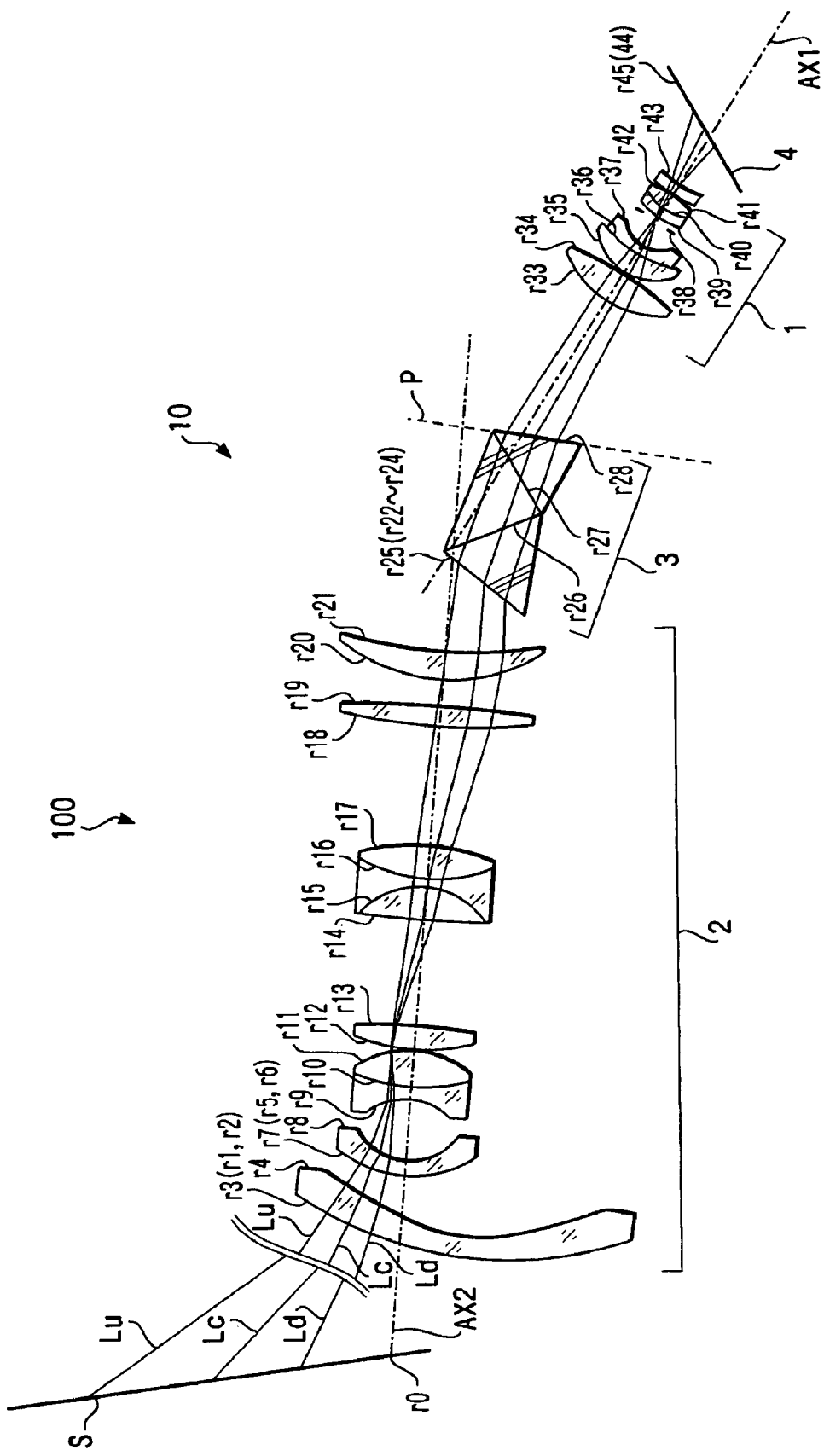
FIG. 2 is an enlarged side view of a projecting optical system with the optical path being developed, according to the embodiment of the invention.

FIG. 2 is an enlarged side view of the projecting optical system 10 with the optical path thereof being developed. In FIG. 2, the first mirror 20 and the second mirror 30 are omitted for brevity. As shown in FIG. 2, the projecting optical system 10 includes a first projecting optical system 1, an intermediate optical system (e.g., a deflecting optical system) 3, a second projecting optical system 2, and an image source unit 4.

In FIG. 2, AX1 denotes an optical axis of the first projecting optical system 1, and AX2 denotes an optical axis of the second projecting optical system 2. In FIG. 2, the optical axes AX1 and AX2 are indicated by dotted lines. FIG. 2 is, therefore, a cross sectional view of the projecting optical system 10 taken along a plane including the optical axes AX1 and AX2. It should be noted that the plane including the optical axes AX1 and AX2 divides the screen S substantially evenly along a vertical line passing the center of the screen S. In the following description, the plane including the optical axes AX1 and AX2 will be referred to as a reference plane.

In the projection device 100, the lenses and/or part of optical surfaces of each of the optical systems 1 and 2 are shifted with each other in order to compensate for aberration and/or distortion that cannot be compensated for by rotationally symmetrical optical systems. Thus, in the following description, in each projecting optical system 1 and 2, a line mostly coincides with the central axis of contained optical surfaces will be defined as an optical axis thereof. If all the central axes are shifted from each other, a line coincides with the central axis of the optical surface closest to a pupil will be defined as the optical axis of the optical system.

In the actual projection device 100, depending on the positional relationship among the optical elements, further mirrors may be provided, in addition to the first and second mirrors 20 and 30, to bend the optical path inside the projection optical system 10. In the following description, however, each element will be illustrated with developing the optical axis (i.e., assuming that all the optical elements are arranged on the reference plane).

The image source unit 4 displays an image to be expanded and projected on the screen S. The light emitted by the image source unit 4 carrying the image passes through the first projecting optical system 1 and forms an intermediate image on an intermediate image plane P. The intermediate optical system 3 includes three triangular prisms arranged in the vicinity of the image plane P. The intermediate optical system 3 connects pupils of the projecting optical systems 1 and 2. The intermediate optical system 3 deflects the light forming the intermediate image and directs the same to the second projecting optical system 2. The second projecting optical system 2 diverges the light that enters via the intermediate optical system 3. The diverging light emerged from the second projecting optical system 2 (i.e., the projecting optical system 10) is reflected by the first mirror 20 and second mirror 30 in this order, and obliquely incident on the screen S from behind (i.e., on an inner surface of the screen S). With this configuration, the image displayed on the image source unit 4 is projected on the screen S.

In FIGS. 1 and 2, a ray, on the reference plane, corresponding to the upper end of the image projected on the screen S is referred to as a ray Lu, a ray, on the reference plane, corresponding to the center of the image projected on the screen S is referred to as a ray Lc, and a ray, on the reference plane, corresponding to the lower end of the image projected on the screen S is referred to as a ray Ld. It is noted that, in the following description, an upper end of the image and lower end of the image correspond to the upper and lower ends of the image on the reference plane, respectively.

On the inner surface of the screen S, a thin-film type Fresnel lens (not shown) is adhered so that the rays obliquely incident on the inner surface of the screen S emerge from the front surface (i.e., from the viewer side) substantially perpendicular to the surface of the screen S.

Figure 3:
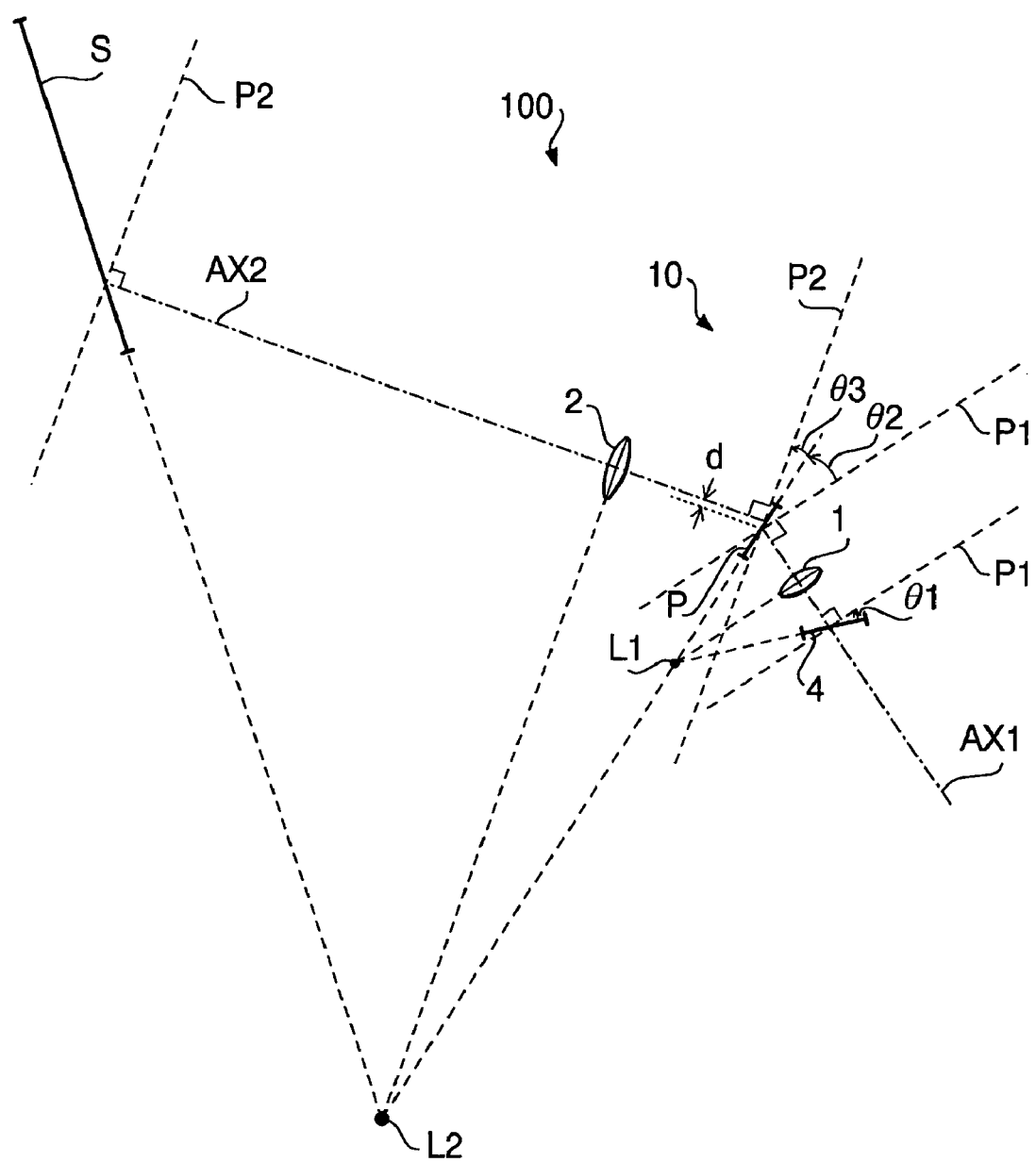
FIG. 3 shows a positional relationship among optical elements according to the embodiment of the invention.

FIG. 3 shows a positional relationship of the screen S and elements of the projecting optical system 10. In FIG. 3, for the sake of simplified explanation, each of the projecting optical systems 1 and 2 is represented by a single lens. In the projection device 100, the image source unit 4, the first projecting optical system 1 and the image plane P of the intermediate image are inclined with each other according to the Scheinpflug's law. That is, extended planes of the image source unit 4, a principal plane of the first projecting optical system 1 and the image plane P intersect at the same line (hereinafter, referred to as a first reference line) L1. Specifically, the image source unit 4 is tilted by angle θ1 with respect to an imaginary plane (hereinafter, referred to as a first imaginary plane) which is perpendicular to the optical axis AX1 of the first projecting optical system 1. Further, the image plane P is titled by angle θ2 with respect to the first imaginary plane P1. It should be noted that, when expressing the tilted angles, a counterclockwise direction (as indicated by arrows: for θ1, in a direction from the image source unit 4 to the imaginary plane P1; and for θ2, in a direction from the first imaginary plane P1 toward the image plane P) in FIG. 3 will be referred to as a positive direction, and the angle is measured with respect to the optical axis AX1.

According to the embodiment, condition (1) is satisfied.

$$-1 > \frac{\tan\theta 2}{\tan\theta 1} > \frac{f1}{\frac{H}{2}\sin\theta 1} \quad (1)$$

where, f1 denotes a focal length of the first projecting optical system 1,

θ1 denotes a tilt angle of the image displaying surface of the image source unit with respect to the first reference plane, H represents a length of the image projected on the screen S in the vertical direction when the projection device 100 is in use (i.e., the height), and θ2 denotes a tilt angle of the image plane P with respect to the first reference surface.

The condition (1) defines tan θ2/tan θ1, that is, a magnification of the first projecting optical system 1 on the optical axis. If the magnification exceeds the upper limit, a reduced image is formed as the intermediate image, which is not preferable since heat concentration may occur. If the magnification is smaller than the lower limit of condition (1), a part of the tilted image source unit 4 is located on the optical system 1 side with respect to the focal point thereof. In such a situation, the light from the part will not form the intermediate image effectively, and the image quality is deteriorated.

When the condition (1) is satisfied, an appropriately enlarged intermediate image can be formed. Therefore, the heat concentration on the image plane of the intermediate image can be avoided, and design freedom of configuration of each optical system and material of optical elements can be enhanced.

In addition to the above, the screen S, the second projecting optical system 2 and the image plane P (the intermediate optical system 3) are arranged in accordance with Scheinpflug's law. That is, extended planes of the screen S, a principal plane of the second projecting optical system 2, and the image plane P intersect with each other on the same line L2, which will be referred to as a second reference line. Specifically, the image plane P is tilted by angel θ3 with respect to an imaginary plane (i.e., a second imaginary plane) P2 which is perpendicular to the optical axis AX2 of the second projecting optical system 2. The screen S is tilted by a predetermined tilt angle with respect to the second imaginary plane P2. It is noted that the tilt angle θ3 measured counterclockwise (indicated by arrow in FIG. 3: in a direction from the image plane P toward the screen side) with respect to the second imaginary plane P2 is a positive angle.

In general, when a rotationally symmetrical optical system is used to form an expanded real image as the intermediate image, in a paraxial region, an aspect ratio on the image source unit 4 and an aspect ratio of the image projected on the screen S cannot be made equal to each other. According to the illustrative embodiment, in order to handle the problem, the optical axis AX2 of the second projecting optical system 2 is shifted with respect to the optical axis AX1 of the first projecting optical system 1 at the intermediate image plane P in a direction away from the reference lines L1 and L2 (i.e., in the upper direction in FIG. 2). With this configuration, an error of the aspect ratios can be reduced. Specifically, the projection device 100 is configured to satisfy condition (2) below.

$$\frac{\tan\theta 2}{\tan\theta 1}\left(1 - \frac{d\sin\theta 3}{f2}\right) \leq -1 \quad (2)$$

where, d denotes a distance between the optical axes AX1 and AX2 on the image plane P, θ3 denotes a tilt angel of the image plane P with respect to the second reference plane, and f2 denotes a focal length of the second projecting optical system 2.

In the condition (2), if the distance d has a positive value, it is possible to shift the optical axis AX2 of the second projecting optical system 2 in a direction away from the reference lines L1 and L2 (i.e., in the upper direction in FIG. 2) with respect to the optical axis AX1 of the first projecting optical system on the intermediate image plane P. That is, the configuration of the projection device 100 can be made close to a configuration where the optical axes AX1 and AX2 are on the same line. By making the optical axes AX1 and AX2 closer to each other (e.g., by shifting the second projecting optical system 2 toward the extension of the optical axis AX1), the optical performance of the projection device 100 is improved, and the incident angle with respect to the screen S can be increased.

The condition (2) defines a condition for reducing the difference of the aspect ratios of the image displayed on the image source unit 4 and the image projected on the screen S. If the value of d is increased to exceeds the upper limit of the condition (2), it is impossible to make the aspect ratio of the image projected on the screen S equal to the aspect ratio of the image displayed on the image source unit 4.

If the second projecting optical system 2 consists of rotationally symmetrical lenses, regardless of the value of d, it is impossible to paraxially compensate for the difference of the aspect ratios. However, at least one of the lenses of the second projecting optical system 2, preferably a lens closer to the screen S, is shifted (decentered), the light passes through an outer area of the lens. Thus, the lens function as an anamorphic lens and the difference of the aspect ratio.

As described above, in the projection device 100, Scheinpflug's law is applied twice. Thus, the light emitted by the image source unit 4 that displays a rectangular image forms the intermediate image having a trapezoidal distortion via the first projecting device 1 with an in-focus condition. Then, the light that forms the intermediate image is incident on the second imaging projecting system, which forms an enlarged image on the screen S with canceling the trapezoidal distortion of the intermediate image. Thus, the user can observe the image that is not affected by the trapezoidal distortion.

If both the conditions (1) and (2) are satisfied, the enlarged intermediate image can be formed on the intermediate image plane P. Thus, the heat concentration on the image plane P can be prevented effectively. Further, the difference of the aspect ratios can be resolved. Thus, the projection device 100 can provide the high-quality and sufficiently enlarged images.

Next, a concrete example of the projection device 100 will be illustrated hereinafter.

TABLE 1 shows numerical examples of the projection device 100. In TABLE 1, the tilt angle φ (unit: degrees) of each element represents a tilted amount with respect to a plane perpendicular to both optical axes AX1 and AX2. The tilted amount is measured such that a counterclockwise direction represents a positive value. The shift amounts Y of each element in TABLE 1 represents a shifted amount of each element with respect to the optical axis with maintaining the tilted amount. The shift amount Y is measured such that a direction away from the first reference line L1 and the second reference line L2 represents a positive value.

TABLE 1

| | SURFACE NUMBER | RADIUS OF CURVATURE | SURFACE DISTANCE | REFRACTIVE INDEX | ABBE's NUMBER | SHIFT AMOUNT Y | TILT ANGLE $\theta$ | ASPHERICAL SURFACE COEFFICIENT 4th DEGREE | 6th DEGREE | DESCRIPTION |
|---|---|---|---|---|---|---|---|---|---|---|
| SCREEN S | 0 | INFINITY | 0.0 | | | | | | | |
| SECOND | 1 | INFINITY | 820.0 | | | | −30.0 | | | |
| PROJECTING | 2 | INFINITY | 0.0 | | | −14.9 | | | | |
| OPTICAL | 3 | 132.4 | 5.0 | 1.493 | 55.2 | | −8.1 | 1.1024E−06 | −6.6455E−11 | SYMMETRICAL |
| SYSTEM 2 | | | | | | | | | | ASPHERICAL |
| | 4 | 45.0 | 0.0 | | | | | −3.3781E−07 | −2.6587E−09 | |
| | 5 | INFINITY | 0.0 | | | | 4.8 | | | |
| | 6 | INFINITY | 20.1 | | | −1.5 | | | | |
| | 7 | 27.7 | 3.6 | 1.831 | 28.7 | | | | | |
| | 8 | 14.7 | 15.3 | | | | | | | |
| | 9 | −15.8 | 3.0 | 1.767 | 37.8 | | | | | |
| | 10 | 34.3 | 8.9 | 1.693 | 49.1 | | | | | |
| | 11 | −23.7 | 0.5 | | | | | | | |
| | 12 | 46.2 | 5.7 | 1.846 | 23.8 | | | | | |
| | 13 | −202.3 | 27.4 | | | | | | | |
| | 14 | −6468.1 | 8.3 | 1.768 | 46.2 | | | | | |
| | 15 | −19.5 | 1.8 | 1.836 | 31.0 | | | | | |
| | 16 | 37.2 | 8.3 | 1.558 | 67.0 | | | | | |
| | 17 | −44.6 | 30.1 | | | | | | | |
| | 18 | 151.3 | 5.0 | 1.826 | 43.2 | | | | | |
| | 19 | −384.5 | 6.7 | | | | | | | |
| | 20 | 42.2 | 7.1 | 1.603 | 65.5 | | | | | |
| | 21 | 103.8 | 4.0 | | | | | | | |
| INTERMEDIATE | 22 | INFINITY | 0.0 | | | −5.2 | | | | |
| OPTICAL | 23 | INFINITY | 0.0 | | | | −14.7 | | | |
| SYSTEM 3 | 24 | INFINITY | 14.7 | | | | −19.9 | | | NO |
| | 25 | INFINITY | 14.0 | 1.709 | 30.3 | | 40.0 | | | COORDI- |
| | 26 | INFINITY | 14.7 | 1.751 | 26.4 | | −40.0 | | | NATE |
| | 27 | INFINITY | 10.0 | 1.814 | 43.8 | | 10.2 | | | MOVEMENT |
| | 28 | INFINITY | 18.5 | | | | | | | |
| FIRST | 29 | INFINITY | 0.0 | | | −0.9 | | | | |
| PROJECTING | 30 | INFINITY | 0.0 | | | | −14.9 | | | |
| OPTICAL | 31 | INFINITY | 12.2 | | | | | | | |
| SYSTEM 1 | 32 | INFINITY | 8.8 | | | | | | | |
| | 33 | 21.9 | 7.6 | 1.603 | 65.4 | | | −2.1811E−05 | −2.0839E−08 | ROTATIONALLY SYMMETRICAL ASPHERICAL SURFACE |
| | 34 | −75.6 | 0.6 | | | | | −2.9204E−06 | 1.3955E−08 | |
| | 35 | 13.9 | 5.7 | 1.720 | 50.0 | | | | | |
| | 36 | 29.4 | 2.0 | 1.787 | 25.3 | | | | | |
| | 37 | 8.1 | 8.1 | | | | | | | |
| | 38 | INFINITY | 0.5 | | | | | | | |
| | 39 | 27.0 | 2.0 | 1.771 | 30.5 | | | | | |
| | 40 | 10.6 | 4.0 | 1.830 | 42.4 | | | | | |
| | 41 | −18.5 | 0.5 | | | | | | | |
| | 42 | 33.8 | 2.2 | 1.821 | 41.1 | | | −3.6117E−04 | 2.2988E−06 | ROTATIONALLY SYMMETRICAL ASPHERICAL SURFACE |
| | 43 | 13.1 | 0.0 | | | | | −4.0140E−04 | 2.9526E−06 | |
| | 44 | INFINITY | 1.3 | | | | −26.5 | | | |
| IMAGE SOURCE 4 | 45 | INFINITY | 0.0 | | | 3.7 | | | | |

In TABLE 1, surface number (#) 0 represents the screen S. Surfaces #1-#21 represent the second projecting optical system 2. Surfaces #22-#28 represent the deflection optical system, and surfaces #20-#43 represent the first projecting optical system 1. Surfaces #44 and #45 represent the image source unit 4.

Surfaces #1, #2, #5, #6, #22-#24, #29-#32, #44 are virtual surfaces (decenter defining surfaces) for defining decentered condition such as the shift and tilted amount of the subsequent surface. Surfaces #25-#27 are surfaces of the three triangular prisms of the deflection optical system 3, which surfaces also function as decenter defining surfaces. It should be noted that the coordinate system after the decentering is a relative coordinate system which depends on the condition of the decenter defining surfaces. It should be noted that, in the surface #24-#27, shift of the coordinate system due to tilting thereof is not taken into account, and the coordinate system based on the condition of the surface #21 is used.

As shown in TABLE 1, the surfaces #3, #4, #33, #34, #42 and #43 are rotationally symmetrical aspherical surfaces. Generally, a shape of the aspherical surface is expressed by a sag amount which is a distance from a tangential plane to the aspherical surface at the optical axis thereof. Specifically, given that the sag at a point whose height from the rotational axis is h is indicated as X(h), the curvature (1/r)

of the aspherical surface on the optical axis (i.e., rotational axis) is C, a conical coefficient is K, and aspherical surface coefficients are $A_4, A_6, \ldots$, the sag $X(h)$ is expressed by formula (3) below.

$$X(h) = \frac{Ch^2}{1+\sqrt{1-(K+1)C^2h^2}} + A_4h^4 + A_6h^6 + \cdots \quad (3)$$

It should be noted that in the expression of the aspherical coefficients, each value in TABLE 1 represents a radix number, and a number on the right-hand side of "E" represents a power. In the embodiment, the conical coefficient K and aspherical coefficients for degrees that are not indicated herein are zero.

It is assumed that the image source unit 4 is configured such that the height H is 10.46 mm, a length in a direction perpendicular to the height H (i.e., a direction corresponding to the horizontal direction of the image projected on the screen) is 18.85 mm. According to the first embodiment, the focal length f1 of the first projecting optical device 1 is 22.8 mm, the tilt angle θ1 of the image source unit 4 is −26.5° as indicated at #44, and the tilt angle θ2 is 29.4°. By substituting the above values in central and right terms of condition (1), values −1.130 and −9.770 are obtained. That is, it is ensured that the embodiment satisfies condition (1).

It is noted that the area of the image source unit 4 is 197.2 mm², which the are of the intermediate image plane is 557.5 mm². That is, the area of the intermediate image is 2.83 times as large as that of the image source unit 4. That is, heat concentration is effectively avoided.

Further, the distance d is 6.1 mm, the tilt angle θ3 of the intermediate image is −0.2°, the focal length f2 of the second projecting optical system 2 is 25.1 mm. By substituting these values in the left term of condition (2), a value −1.131 is obtained. Thus, it is ensured that the embodiment satisfies the condition (2). As the condition (2) is satisfied, it is possible to reduce the difference between the aspect ratio of the image displayed on the image source unit 4 and the aspect ratio of the image projected on the screen S, effectively.

Figure 4:
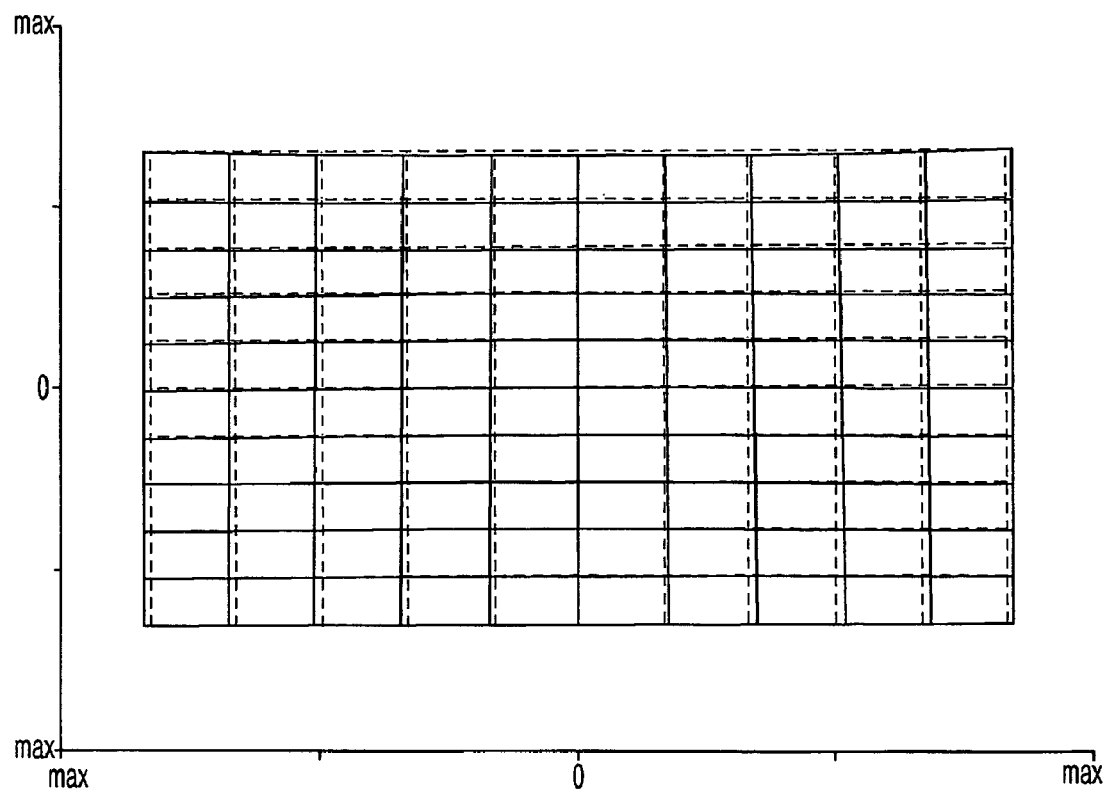
FIG. 4 shows the degree of distortion of an image projected by the projection device according to the embodiment.

FIG. 4 shows the degree of distortion of an image projected by the projection device 100 according to the embodiment. In FIG. 4, solid lines represent an image projected on the screen S, while the broken lines represent an ideal image having no distortion. It is understood from FIG. 4 that, in the image projected by the projection device 100 configured as described above, the distortion is well eliminated, and is very close to the ideal image.

It should be note that the invention should not be limited to the configuration described above, and various modification can be derived without departing from the aspects of the invention. For example, the embodiment employs three triangular prisms as the intermediate optical system. However, this can be replaced with another structure such as Fresnel mirror and the like.

Further, it may be possible that the intermediate image may not be sufficiently focused on the intermediate image plane. In other words, the functions of the first projecting optical system and the second projecting optical system need not be divided precisely. Further, the optical elements may be arranged so as not to exactly follow Scheinpflug's law.

The present disclosure relates to the subject matter contained in Japanese Patent Application No. 2005-202795, filed on Jul. 12, 2005, which is expressly incorporated herein by reference in its entirety.

What is claimed is:

1. A projection device, comprising:
   an image source unit configured to emit light carrying an image;
   a first projecting optical system configured to form an intermediate image carried by the light emitted by the image source unit;
   a second projecting optical system;
   an intermediate optical system configured to lead light carrying an image from the first projecting optical system to the second projecting optical system, the second projecting optical system being configured to project light lead by the intermediate optical system to a screen of the projection device,
   wherein an image displaying surface of the image source unit is tilted with respect to a first imaginary plane that is perpendicular to an optical axis of the first projecting optical system,
   wherein the intermediate image is tilted with respect at least the first imaginary plane,
   wherein following relationship is satisfied:

$$-1 > \frac{\tan\theta 2}{\tan\theta 1} > \frac{f1}{\frac{H}{2}\sin\theta 1}$$

where, f1 denotes a focal length of the first projecting optical system,
θ1 denotes a tilt angle of the image displaying surface of the image source unit with respect to the first imaginary plane,
H represents a length of the image source unit which corresponds to the image projected on the screen in the vertical direction, and
θ2 denotes a tilt angle of the intermediate image with respect to the first imaginary plane, the tilt angel θ1 being measured in a direction from the image displaying surface of the image source unit toward the first imaginary plane, the tilt angel θ2 being measured in a direction from the first imaginary plane toward the intermediate image.

2. The projection device according to claim 1,
   wherein the intermediate image is tilted with respect to a second imaginary plane that is perpendicular to an optical axis of the second projecting optical system, and
   wherein following relationship is satisfied:

$$\frac{\tan\theta 2}{\tan\theta 1}\left(1 - \frac{d\sin\theta 3}{f2}\right) \leq -1$$

where, d denotes a distance between the optical axes of the first projecting optical system and the second projecting optical system on an image plane of the intermediate image, f2 denotes a focal length of the second projecting optical system, and θ3 denotes a tilt angle of the intermediate image with respect to the second imaginary plane, and
wherein the tilt angle θ3 is measured in a direction from the intermediate image toward the second imaginary plane.

3. The projection device according to claim 2,
wherein the optical axis of the first projecting optical system and the optical axis of the second projecting optical system are on a same plane when an optical path is developed, and
wherein the distance d is set such that the second projecting optical system approaches a line which is an extension of the optical axis of the first projecting optical system.

4. The projection device according to claim 1,
wherein the intermediate optical system is arranged in the vicinity of the intermediate image.

* * * * *